US012654771B2

(12) United States Patent
Larson et al.

(10) Patent No.: US 12,654,771 B2
(45) Date of Patent: Jun. 16, 2026

(54) SYSTEM AND METHOD FOR DYNAMICALLY AUGMENTING A STEERING RATIO

(71) Applicant: GM GLOBAL TECHNOLOGY OPERATIONS LLC, Detroit, MI (US)

(72) Inventors: Travis S. Larson, Washington, MI (US); Michael C. Gaunt, Metamora, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 63 days.

(21) Appl. No.: 18/977,051

(22) Filed: Dec. 11, 2024

(65) Prior Publication Data

US 2026/0159157 A1      Jun. 11, 2026

(51) Int. Cl.
*B62D 6/00* (2006.01)
*B62D 5/00* (2006.01)
*B62D 5/04* (2006.01)

(52) U.S. Cl.
CPC ............. *B62D 6/008* (2013.01); *B62D 5/006* (2013.01); *B62D 5/0421* (2013.01)

(58) Field of Classification Search
CPC ....... B62D 5/008; B62D 5/0421; B62D 1/166
USPC ............................................ 701/41; 180/402
See application file for complete search history.

(56) References Cited

U.S. PATENT DOCUMENTS

| | | | | |
|---|---|---|---|---|
| 5,267,625 A | * | 12/1993 | Shimizu | B62D 5/0421 |
| | | | | 180/443 |
| 5,489,004 A | * | 2/1996 | Shimizu | B62D 1/166 |
| | | | | 180/428 |
| 6,374,693 B1 | * | 4/2002 | Kawabe | B62D 3/06 |
| | | | | 180/443 |
| 9,452,776 B1 | * | 9/2016 | Hwa | B62D 5/0481 |
| 2012/0203426 A1 | * | 8/2012 | Held | B60W 40/09 |
| | | | | 701/36 |
| 2020/0088596 A1 | * | 3/2020 | Hwang | B62D 6/008 |
| 2024/0067264 A1 | * | 2/2024 | Lee | B62D 6/008 |

FOREIGN PATENT DOCUMENTS

| | | | | |
|---|---|---|---|---|
| DE | 102011082567 A1 | | 3/2013 | |
| DE | 102008026652 B4 | | 8/2020 | |
| DE | 102023202500 A1 | * | 9/2024 | B62D 6/002 |

* cited by examiner

*Primary Examiner* — Logan M Kraft
*Assistant Examiner* — Joshua Campbell
(74) *Attorney, Agent, or Firm* — Quinn IP Law

(57) ABSTRACT

A steer-by-wire system includes a hand wheel actuator coupled to a steering column, a steering angle sensor coupled to the steering column and configured to measure movement of the steering column, a road wheel actuator configured to engage a steering rack, and a controller in electrical communication with the hand wheel actuator, the steering angle sensor, and the road wheel actuator. The controller is configured to identify movement of a hand wheel actuator mechanically coupled to the steering column with a steering angle sensor and determine an acceleration of the hand wheel actuator. The controller is also configured to determine an acceleration of a road wheel actuator configured to engage the steering rack for selectively changing a wheel angle and increase a steering ratio of the steer-by-wire system when the acceleration of the road wheel actuator is above a predetermined threshold value.

20 Claims, 3 Drawing Sheets

SYSTEM AND METHOD FOR DYNAMICALLY AUGMENTING A STEERING RATIO

BACKGROUND

The present disclosure relates to steering a vehicle, and more particularly, to a steering system that dynamically augments a steering ratio in a steer-by-wire system.

Steer-by-wire systems are an alternative to mechanical steering linkages that provide a direct mechanical connection found on many vehicles. Steer-by-wire systems utilize electronic controls and actuators to translate input into the hand wheel by a driver into an output that will result in the steerable road wheels moving to a desired road angle. Mechanical steering systems rely on a direct mechanical connection between the hand wheel and the steerable wheels through a steering column, rack and pinion, or similar mechanisms. Mechanical steering systems may include a motor or hydraulic power assist to aid the driver in turning the steerable wheels.

SUMMARY

Disclosed herein is a steer-by-wire system. The system includes a hand wheel actuator coupled to a steering column, a steering angle sensor coupled to the steering column and configured to measure movement of the steering column, a road wheel actuator configured to engage a steering rack, and a controller in electrical communication with the hand wheel actuator, the steering angle sensor, and the road wheel actuator. The controller is configured to identify movement of a hand wheel actuator mechanically coupled to the steering column with a steering angle sensor and determine an acceleration of the hand wheel actuator. The controller is also configured to determine an acceleration of a road wheel actuator configured to engage the steering rack for selectively changing a wheel angle and increase a steering ratio of the steer-by-wire system when the acceleration of the road wheel actuator is above a predetermined threshold value.

In one aspect of the disclosure the controller is configured to determine a velocity of the hand wheel actuator and hold the road wheel actuator in a fixed position when the velocity of the hand wheel actuator is zero.

In one aspect of the disclosure the controller is configured to maintain a constant steering ratio of the steer-by-wire system when the acceleration of the hand wheel actuator is less than a predetermined threshold value.

In one aspect of the disclosure the hand wheel actuator is configured to provide feedback torque through the steering column.

In one aspect of the disclosure the system includes a position sensor configured to determine a position of the steering rack and the controller is configured to determine the acceleration of the road wheel actuator with steering rack position sensor.

In one aspect of the disclosure the controller is configured to determine a velocity of the road wheel actuator with the position sensor and increase a feedback torque to the steering column through the hand wheel actuator when the velocity of the road wheel actuator is above a predetermined threshold value.

In one aspect of the disclosure the road wheel actuator includes a drive unit configured to engage the steering rack through a gear drive.

In one aspect of the disclosure the controller is configured to selectively operate the drive unit to generate varying steering ratios.

Disclosed herein is a method of operating a steer-by-wire system. The method includes identifying movement of a hand wheel actuator mechanically coupled to a steering column with a steering angle sensor and determining an acceleration of the hand wheel actuator. The method also includes determining an acceleration of a road wheel actuator configured to engage a steering rack and for selectively changing a wheel angle and increasing a steering ratio of the steer-by-wire system when the acceleration of the road wheel actuator is above a predetermined threshold value.

In one aspect of the disclosure the method includes determining a velocity of the road wheel actuator and increasing a feedback torque to the steering column through the hand wheel actuator when the velocity of the road wheel actuator is above a predetermined threshold value.

In one aspect of the disclosure identifying movement of the hand wheel actuator includes determining a velocity of the hand wheel actuator and holding the road wheel actuator in a fixed position when the velocity of the hand wheel actuator is zero.

In one aspect of the disclosure the method includes maintaining a constant steering ratio of the steer-by-wire system when the acceleration of the hand wheel actuator is less than a predetermined threshold value.

In one aspect of the disclosure the hand wheel actuator is configured to provide feedback torque through the steering column.

In one aspect of the disclosure the road wheel actuator is configured to drive the steering rack at varying steering ratios.

Disclosed herein is a vehicle. The vehicle includes a hand wheel coupled to a steering column, a steering rack coupled to a pair of front wheels and a steer-by-wire system coupled to the steering column and the steering rack The system includes a hand wheel actuator coupled to a steering column, a steering angle sensor coupled to the steering column and configured to measure movement of the steering column, a road wheel actuator configured to engage a steering rack, and a controller in electrical communication with the hand wheel actuator, the steering angle sensor, and the road wheel actuator. The controller is configured to identify movement of a hand wheel actuator mechanically coupled to the steering column with a steering angle sensor and determine an acceleration of the hand wheel actuator. The controller is also configured to determine an acceleration of a road wheel actuator configured to engage the steering rack for selectively changing a wheel angle and increase a steering ratio of the steer-by-wire system when the acceleration of the road wheel actuator is above a predetermined threshold value.

BRIEF DESCRIPTION OF THE DRAWINGS

The accompanying drawings, which are incorporated into and constitute a part of this specification, illustrate implementations of the disclosure and together with the description, explain the principles of the disclosure.

DETAILED DESCRIPTION

Those having ordinary skill in the art will recognize that terms such as "above," "below", "upward", "downward", "top", "bottom", "left", "right", etc., are used descriptively for the figures, and do not represent limitations on the scope of the disclosure, as defined by the appended claims. Furthermore, the teachings may be described herein in terms of functional and/or logical block components and/or various processing steps.

Figure 1:
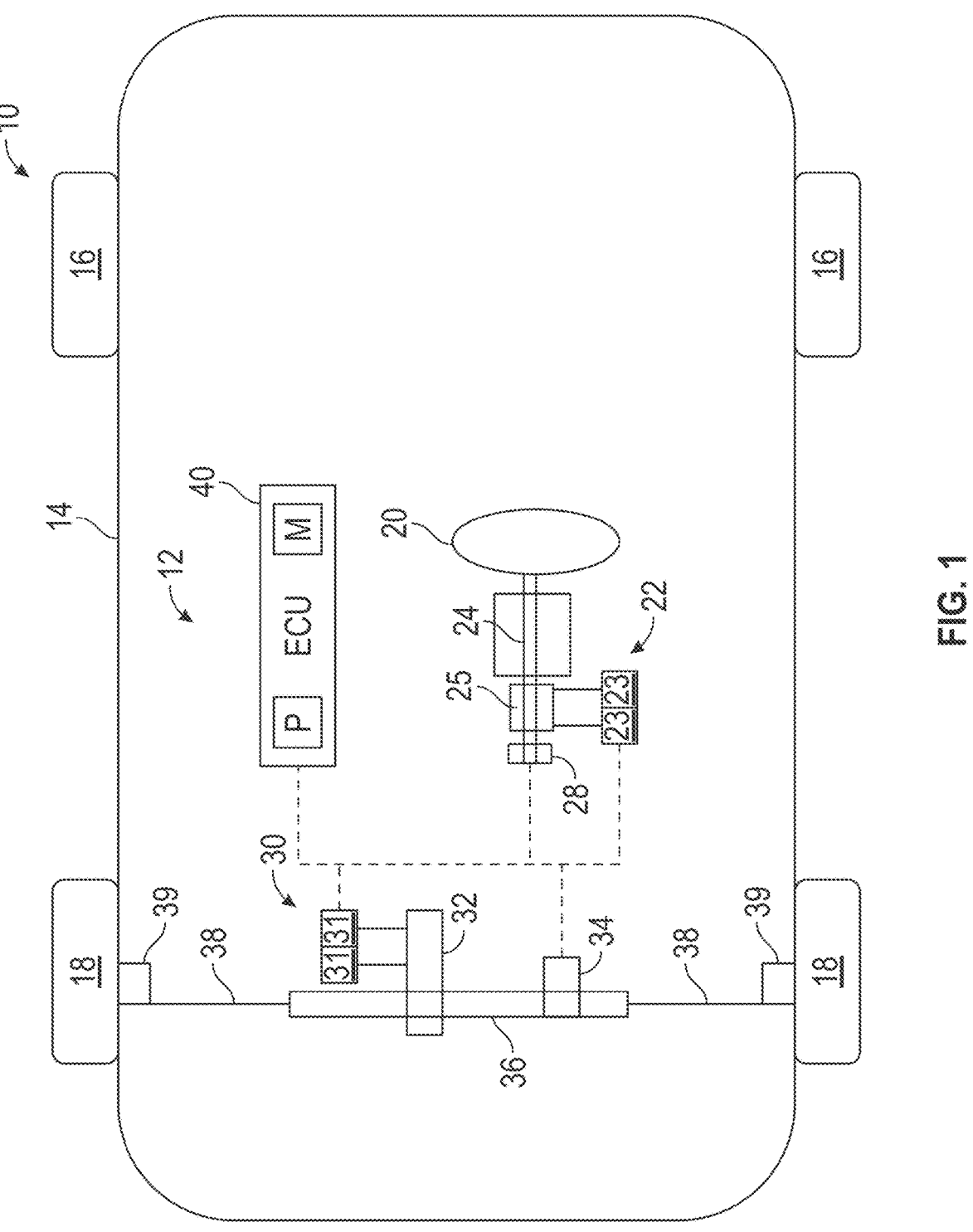
FIG. 1 schematically illustrates a vehicle including an example steer-by-wire system.

FIG. 1 illustrates an example of a vehicle 10 including a steering system 12, such as a steer-by-wire system. In the illustrated example, the vehicle 10 includes a body 14 at least partially defining a passenger cabin that is supported by a pair of rear wheels 16 and a pair of front wheels 18 that are steerable to create a road angle for steering the vehicle 10 in a desired direction. The steering system 12 includes a hand wheel actuator (HWA) 22 mechanically connected to a hand wheel 20, such as a steering wheel, and a road wheel actuator (RWA) 30 mechanically connected to a steering rack 36 for moving the front wheels 18 to different road angles.

The hand wheel 20 is connected to an upper steering column 24 such that rotation of the hand wheel 20 in a desired direction causes the upper steering column to rotate in the same rotational direction and speed. A steering angle sensor (SAS) 28 is attached to the steering column 24 and monitors steering input from the hand wheel 20. In particular, the SAS 28 determines a position and rate of rotation of the hand wheel 20. The position and rate of rotation of the hand wheel 20 determined by SAS 28 is communicated to an electronic control unit (ECU) 40 or controller as will be discussed in greater detail below.

In the illustrated example, the HWA 22 includes redundant drive units 23 each have a motor and motor controller each in communication with a gear drive 25 mechanically connected to the upper steering column 24. When the ECU 40 receives position and rate of rotation information from the SAS 28, the ECU 40 provides a feedback torque command for the HWA 22 that is received by at least one of the motor controllers. The feedback torque command directs the HWA 22 to apple a feedback torque to the steering column 24 that is felt by the driver engaging the hand wheel 20. One feature of the HWA 22 is to provide the driver with feedback from the front wheels 18 similar to a mechanical steering system.

The steering system 12 also includes a road wheel actuator (RWA) 30 in electrical communication with the ECU 40. The RWA 30 is in engagement with a steering rack 36 through a gear drive 32 that directs the front wheels 18 to have different road angles. In the illustrated example, the RWA 30 includes redundant drive units 31 each having a motor and a motor controller. Each of the motor and controller combinations is configured to receive command signals from the ECU 40 and drive the gear drive 32 to cause the steering rack 36 to move the front wheels 18 to the desired road angle. The steering rack 36 is connected to a steering knuckle 39 at each of the front wheels 18 through a pair of tie rods 38. The front wheels 18 are rotatably connected to the knuckle 40 through a wheel bearing hub. Lateral movement of the tie rods 38 causes the front wheels 18 to have a desired road angle. A lateral position of the steering rack 36 is monitored through a rack position sensor 34 that is in electric communication with the ECU 40 to provide information to the ECU 40 regarding the position and movement, such as acceleration and velocity, of the steering rack 36. Accordingly, the ECU 40 provides suitable signals to the RWA 30 to change position of the steering rack 36 and the rack position sensor 34 monitors the position of the steering rack 36 and communicates that information to the ECU 40 for control purposes.

In this disclosure, the ECU 40 may be equipped with one or more processors (P), e.g., logic circuits, combinational logic circuit(s), Application Specific Integrated Circuit(s) (ASIC), electronic circuit(s), central processing unit(s), semiconductor IC devices, etc., as well as input/output (I/O) circuit(s), appropriate signal conditioning and buffer circuitry, and other components such as a high-speed clock. The ECU 40 also includes an associated non-transitory computer-readable storage medium, i.e., memory (M) inclusive of read only, programmable read only, random access, a hard drive, etc., whether resident, remote or a combination of both.

Figure 2:
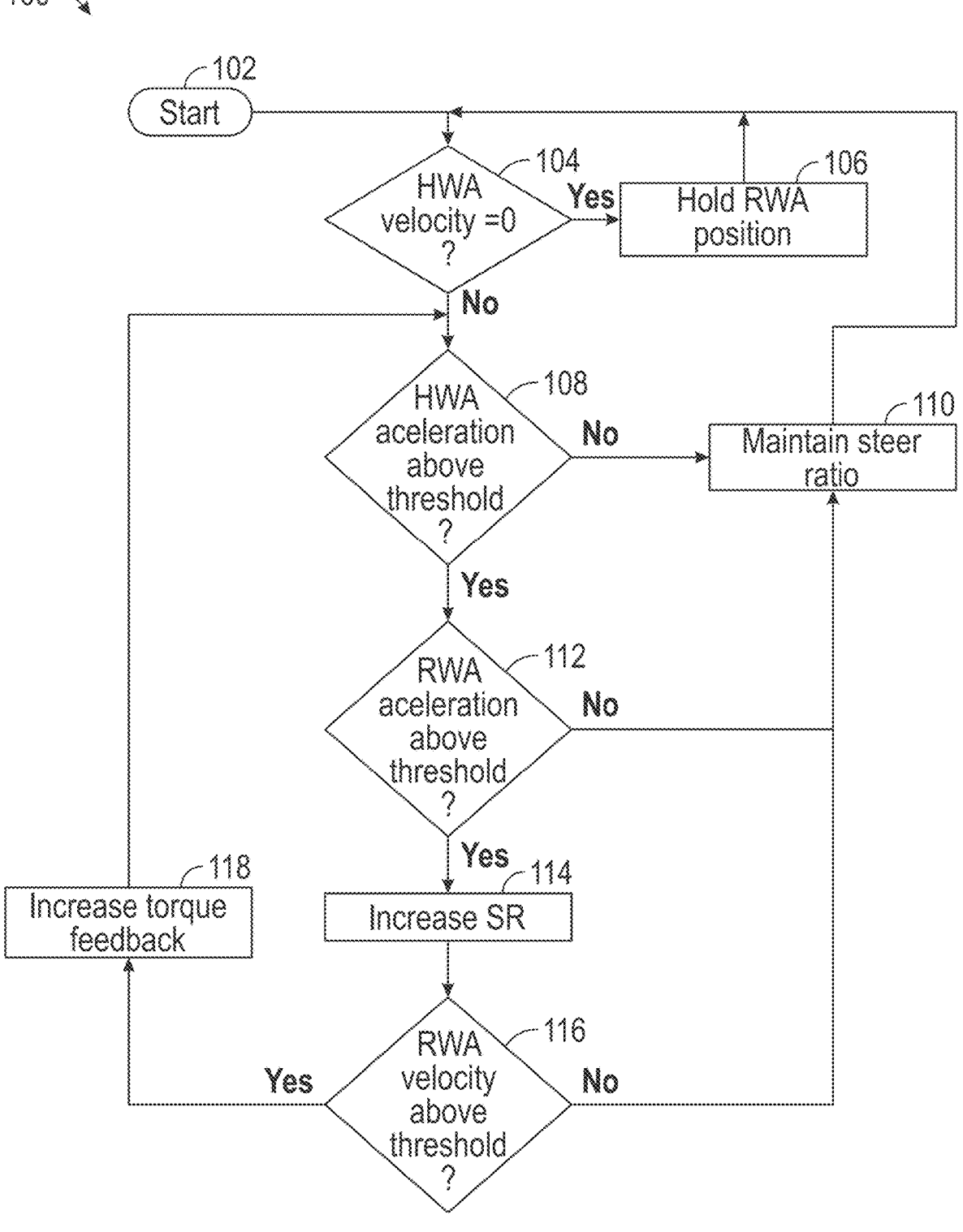
FIG. 2 is a flow diagram of a method of operating the example steer-by wire system of FIG. 1.

FIG. 2 illustrates a flow diagram of an example method 100 of operating the steering system 12 of FIG. 1. The method 100 begins at block 102 ("Start"). From block 102, the method 100 proceeds to block 104.

At block 104 ("HWA Velocity=0?"), the method 100 determines a rotational velocity of the HWA 22. The method 100 can utilize the SAS 28 in connection with the ECU 40 to determine the rotational velocity of the HWA 22 at a given point in time. If the ECU 40 determines that the velocity of the HWA 22 is zero, the method 100 proceeds to block 106 ("Hold RWA Position").

At block 106 of the method 100, the method 100 directs the RWA 30 through the ECU 40 to hold a constant position to prevent changes in the road angle of the front wheels 18. From block 106, the method 100 returns to block 104 to continue monitoring the velocity of the HWA 22. When the velocity of the HWA 22 is no longer equal to zero, the method 100 proceeds to block 108.

At block 108 ("HWA accel. above threshold"), the method 100 determines an acceleration of the HWA 22 through utilizing the SAS 28 in connection with the ECU 40. With the acceleration of the HWA 22 determined, the method 100 compares the acceleration of the HWA 22 to a predetermined threshold value. If the acceleration of the HWA 22 determined at block 108 by the SAS 28 is less than the predetermined threshold value, the method 100 proceeds to block 110.

At block 110 ("Maintain Steer Ratio"), the method 100 maintains a predetermined steering ratio for the steering system 12. The steering ratio for the steering system 12 defines a relationship between degrees of rotation of the hand wheel 20 to degrees of road angle for the front wheels 18. If the acceleration of the HWA 22 is greater than the predetermined threshold value at block 108, the method 100 proceeds to block 112.

At block 112 ("RWA accel. above threshold?"), the method 100 determines an acceleration of the RWA 30. In one example, the acceleration of the RWA 30 is measured by the rack position sensor 34 to determine an acceleration of the steering rack 36 in a lateral direction. If the acceleration measured for the RWA 30 is less than a predetermined threshold value, the method 100 proceeds to block 110 to maintain the steering ratio and then continues to monitor movement of the HWA 22 at block 104. If the acceleration measured for the RWA 30 is greater than the predetermined threshold value, the method 100 proceeds to block 114.

At block 114 ("Increase steering ratio"), the method 100 increases the steering ratio for the steering system 12 to slow a response of the RWA 30 relative to the HWA 22. Increasing the steering ratio for the steering system 12 results in reduced road angle for the front wheels 18 at a given hand wheel 20 rotation for the steering system 12. One feature of dynamically augmenting the steering ratio for the steering system 12 is a reduction in quick directional changes for the vehicle 10 that may result in the passenger discomfort. Accordingly, the increase in steering ratio under these circumstances provides a smoother driving experience for the passengers in the vehicle 10.

Figure 3:
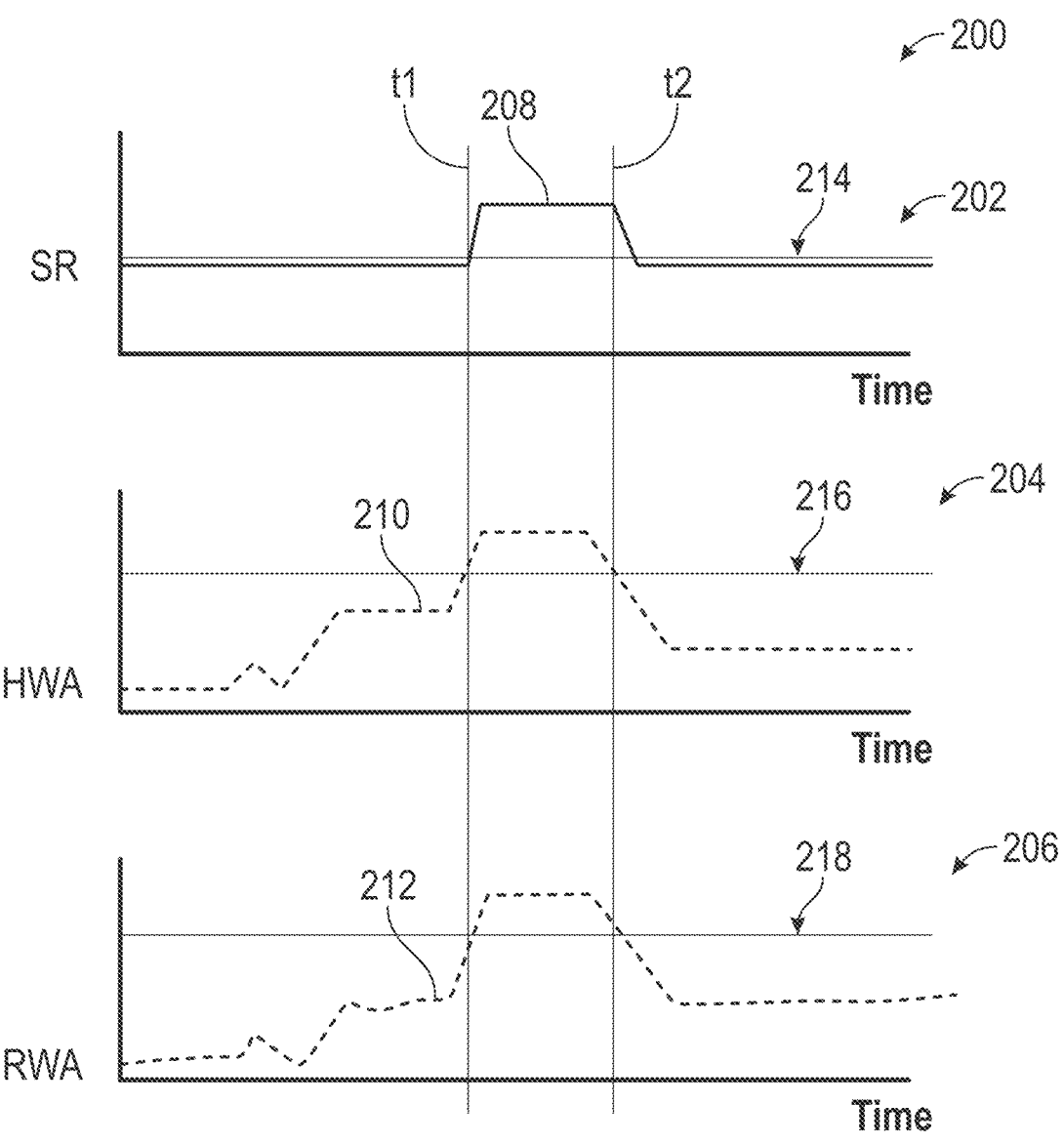
FIG. 3 is a graphical representation of changes in a steering ratio for the steer-by-wire system.

FIG. 3 provides a graphical representation 200 of dynamically augmenting the steering ratio while driving the vehicle. In particular, the graphical representation includes a first graphical representation 202 of steering ratio for the steering system 12 over time, a second graphical representation 204 of HWA acceleration 210 over time, and a third graphical representation 206 of RWA acceleration 212 over time. As shown in the graphical representation 202, the steering ratio SR remains at a nominal value 214 until it is increased to a dynamic value 208. The transition to the dynamic value 208 corresponds to a time when the HWA acceleration and the RWA acceleration each exceed a predetermined threshold value 216 and 218, respectively. From block 114, the method 100 proceeds to block 116.

At block 116, the method 100 determines a velocity of the RWA 30. In one example, the velocity of the RWA 30 is measured by the rack position sensor 34 through determining a velocity of the steering rack 36 in a lateral direction. If the velocity of the RWA 30 is less than a predetermined threshold value, the method 100 returns to block 110 and maintains the increased steering ratio from block 114. The method 100 then returns to block 104 to continue monitoring movement of the HWA 22. If the velocity of the RWA 30 is greater than the predetermined threshold value, the method 100 proceeds to block 118.

At block 118 ("Increase torque"), the method 100 increases torque feedback to the hand wheel 20 through the steering column 24 through utilizing the HWA 22. Increasing the torque feedback felt by the driver in the hand wheel 20 will reduce velocity and acceleration for both the HWA 22 and the RWA 30. With the increase in torque feedback at block 118, the method 100 returns to block 108 to continue monitoring movement of the steering system 12.

The terms "a" and "an" do not denote a limitation of quantity, but rather denote the presence of at least one of the referenced items. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in a suitable manner in the various aspects.

While the above disclosure has been described with reference to exemplary embodiments, it will be understood by those skilled in the art that various changes may be made, and equivalents may be substituted for elements thereof without departing from its scope. In addition, many modifications may be made to adapt a particular situation or material to the teachings of the disclosure without departing from the scope thereof. Therefore, it is intended that the present disclosure is not limited to the particular embodiments disclosed but will include embodiments falling within the scope thereof.

What is claimed is:

1. A steer-by-wire system, comprising:
a hand wheel actuator coupled to a steering column;
a steering angle sensor coupled to the steering column and configured to measure movement of the steering column;
a road wheel actuator configured to engage a steering rack; and a controller in electrical communication with the hand wheel actuator, the steering angle sensor, and the road wheel actuator, wherein the controller is configured to:
identify movement of a hand wheel actuator mechanically coupled to the steering column with a steering angle sensor, wherein the steering angle sensor is configured to rotate with the steering column;
determine an acceleration of the hand wheel actuator;
determine an acceleration of a road wheel actuator configured to engage the steering rack for selectively changing a wheel angle; and
increase a steering ratio of the steer-by-wire system when the acceleration of the road wheel actuator is above a predetermined threshold value.

2. The system of claim 1, wherein the controller is configured to determine a velocity of the hand wheel actuator and hold the road wheel actuator in a fixed position when the velocity of the hand wheel actuator is zero.

3. The system of claim 1, wherein the controller is configured to maintain a constant steering ratio of the steer-by-wire system when the acceleration of the hand wheel actuator is less than a predetermined threshold value.

4. The system of claim 1, wherein the hand wheel actuator is configured to provide feedback torque through the steering column.

5. The system of claim 1, including a position sensor configured to determine a position of the steering rack and the controller is configured to determine the acceleration of the road wheel actuator with steering rack position sensor.

6. The system of claim 5, wherein the controller is configured to determine a velocity of the road wheel actuator with the position sensor and increase a feedback torque to the steering column through the hand wheel actuator when the velocity of the road wheel actuator is above a predetermined threshold value.

7. The system of claim 1, wherein the road wheel actuator includes a drive unit configured to engage the steering rack through a gear drive.

8. The system of claim 7, wherein the controller is configured to selectively operate the drive unit to generate varying steering ratios.

9. A method of operating a steer-by-wire system, the method comprising:
identifying movement of a hand wheel actuator mechanically coupled to a steering column with a steering angle sensor, wherein the steering angle sensor is configured to rotate with the steering column;
determining an acceleration of the hand wheel actuator;
determining an acceleration of a road wheel actuator configured to engage a steering rack and for selectively changing a wheel angle; and
increasing a steering ratio of the steer-by-wire system when the acceleration of the road wheel actuator is above a predetermined threshold value.

10. The method of claim 9, including determining a velocity of the road wheel actuator and increasing a feedback torque to the steering column through the hand wheel actuator when the velocity of the road wheel actuator is above a predetermined threshold value.

11. The method of claim 9, wherein identifying movement of the hand wheel actuator includes determining a velocity of the hand wheel actuator and holding the road wheel actuator in a fixed position when the velocity of the hand wheel actuator is zero.

12. The method of claim 9, including maintaining a constant steering ratio of the steer-by-wire system when the acceleration of the hand wheel actuator is less than a predetermined threshold value.

13. The method of claim 9, wherein the hand wheel actuator is configured to provide feedback torque through the steering column.

14. The method of claim 9, wherein the road wheel actuator is configured to drive the steering rack at varying steering ratios.

15. A vehicle, comprising:

a hand wheel coupled to a steering column;

a steering rack coupled to a pair of front wheels; and a steer-by-wire system coupled to the steering column and the steering rack, wherein the steer-by-wire system includes:

a hand wheel actuator coupled to the steering column;

a steering angle sensor coupled to the steering column and configured to measure movement of the hand wheel;

a road wheel actuator coupled to the steering rack; and a controller in electrical communication with the hand wheel actuator, the steering angle sensor, and the road wheel actuator, wherein the controller is configured to:

identify movement of a hand wheel actuator mechanically coupled to the steering column with a steering angle sensor, wherein the steering angle sensor is configured to rotate with the steering column;

determine an acceleration of the hand wheel actuator;

determine an acceleration of a road wheel actuator configured to engage a steering rack and for selectively changing a wheel angle; and increase a steering ratio of the steer-by-wire system when the acceleration of the road wheel actuator is above a predetermined threshold value.

16. The vehicle of claim 15, wherein the controller is configured to determine a velocity of the road wheel actuator and increase a feedback torque to the steering column through the hand wheel actuator when the velocity of the road wheel actuator is above a predetermined threshold value.

17. The vehicle of claim 15, wherein the controller is configured to determine a velocity of the hand wheel actuator and hold the road wheel actuator in a fixed position when the velocity of the hand wheel actuator is zero.

18. The vehicle of claim 15, wherein the road wheel actuator includes a drive unit configured to engage the steering rack through a gear drive.

19. The vehicle of claim 18, wherein the controller is configured to selectively operate the drive unit to generate varying steering ratios.

20. The vehicle of claim 19, wherein the drive unit includes a redundant pair of motors and motor controllers.

\* \* \* \* \*